United States Patent
Yeh (10) Patent No.: US 8,107,235 B2
(45) Date of Patent: Jan. 31, 2012

(54) ELECTRONIC DEVICE

(75) Inventor: Chih-Shan Yeh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 691 days.

(21) Appl. No.: 12/211,203

(22) Filed: Sep. 16, 2008

(65) Prior Publication Data

US 2009/0116200 A1 May 7, 2009

(30) Foreign Application Priority Data

Nov. 7, 2007 (TW) .............................. 96141900 A (51) Int. Cl.
*G06F 1/16* (2006.01)
*H05K 7/00* (2006.01)
*H05K 5/00* (2006.01)

(52) U.S. Cl. ............ 361/679.56; 361/679.28; 455/575.4

(58) Field of Classification Search ............. 361/679.01, 361/679.26, 679.3, 679.55, 679.56, 730; 455/575.1–575.4
See application file for complete search history.

(56) References Cited

U.S. PATENT DOCUMENTS

| | | | |
|---|---|---|---|
| 7,180,754 B2* | 2/2007 | Qin et al. ..................... 361/797 |
| 7,274,954 B2* | 9/2007 | Oldham ..................... 455/575.3 |
| 7,596,396 B2* | 9/2009 | Fagrenius et al. ........... 455/575.4 |
| 7,853,301 B2* | 12/2010 | Kim et al. ................... 455/575.4 |
| 2004/0085739 A1* | 5/2004 | Lee et al. ..................... 361/727 |
| 2006/0046796 A1* | 3/2006 | Park et al. ................... 455/575.4 |
| 2007/0105606 A1* | 5/2007 | Yoon et al. .................. 455/575.4 |
| 2007/0142101 A1* | 6/2007 | Seshagiri et al. ........... 455/575.4 |
| 2007/0238494 A1* | 10/2007 | Pan ............................. 455/575.4 |
| 2007/0243913 A1* | 10/2007 | Collins ....................... 455/575.4 |
| 2007/0275774 A1* | 11/2007 | Fagrenius et al. .......... 455/575.4 |
| 2008/0070650 A1* | 3/2008 | Kim et al. ................... 455/575.4 |
| 2008/0186663 A1* | 8/2008 | Chen ............................ 361/681 |

FOREIGN PATENT DOCUMENTS

| JP | 2003-110675 A | 4/2003 |
| JP | 2005-286994 A | 10/2005 |
| TW | I258293 B | 7/2006 |
| TW | M304877 Y | 1/2007 |

* cited by examiner

*Primary Examiner* — Jinhee J Lee
*Assistant Examiner* — Adrian S Wilson
(74) *Attorney, Agent, or Firm* — Birch, Stewart, Kolasch & Birch, LLP (57) ABSTRACT

An electronic device comprises a first module, a second module, a flexible printed circuit board, a first protecting cover and a second protecting cover. The first module comprises a bottom plate. The second module is disposed below the first module and comprises a top plate. The flexible printed circuit board connects the first module and the second module. The first protecting cover is disposed below the top plate. The second protecting cover is disposed below the top plate, wherein an end of the second protecting cover is fixed on the bottom plate. When the first module slides relative to the second module from a first position to a second position, the bottom plate forces the second protecting cover to change from a closed state to an opened state to totally cover the flexible printed circuit board.

16 Claims, 11 Drawing Sheets

ELECTRONIC DEVICE

CROSS REFERENCE TO RELATED APPLICATIONS

This application claims priority of Taiwan Patent Application No. 96141990, filed on Nov. 7, 2007, the entirety of which is incorporated by reference herein.

BACKGROUND OF THE INVENTION

1. Field of the Invention

The invention relates to an electronic device, and more particularly to an electronic device provided with side covers, protecting covers, and torsional springs to increase protection of a flexible printed circuit board.

2. Description of the Related Art

A conventional sliding-type electronic device generally includes a display module, a keyboard module, and a flexible printed circuit electrically connecting the display module and the keyboard module. To open the electronic device for use, the display module is pushed and slides relative to the keyboard module from a first position to a second position, and the keys on the keyboard module are exposed. To close the electronic device for storage and transportation, the display module is pushed and slides relative to the keyboard module from the second position back to the first position, and the keyboard module is covered by the display module.

The flexible printed circuit board of the conventional electronic device is disposed between the display module and the keyboard module. After the electronic device is opened, the display module overlaps a portion of the keyboard module for protecting the flexible printed circuit board.

For conventional electronic devices, however, the display module and the keyboard module are not totally opened. Thus, the available area of the keyboard module is reduced, the design of the electronic device is restricted, and the flexible printed circuit board protected by an overlapping area between the display module and the keyboard module is easily damaged.

BRIEF SUMMARY OF THE INVENTION

A detailed description is given in the following embodiments with reference to the accompanying drawings.

The invention provides an electronic device comprising a first module, a second module, a flexible printed circuit board, a first protecting cover, and a second protecting cover. The first module comprises a bottom plate. The second module is disposed below the first module and comprises a top plate. The flexible printed circuit board connects the first module and the second module. The first protecting cover is disposed below the top plate. The second protecting cover is disposed below the top plate, wherein an end of the second protecting cover is fixed on the bottom plate. When the first module slides relative to the second module from a first position to a second position, the bottom plate forces the second protecting cover to change from a closed state to an opened state to totally cover the flexible printed circuit board.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
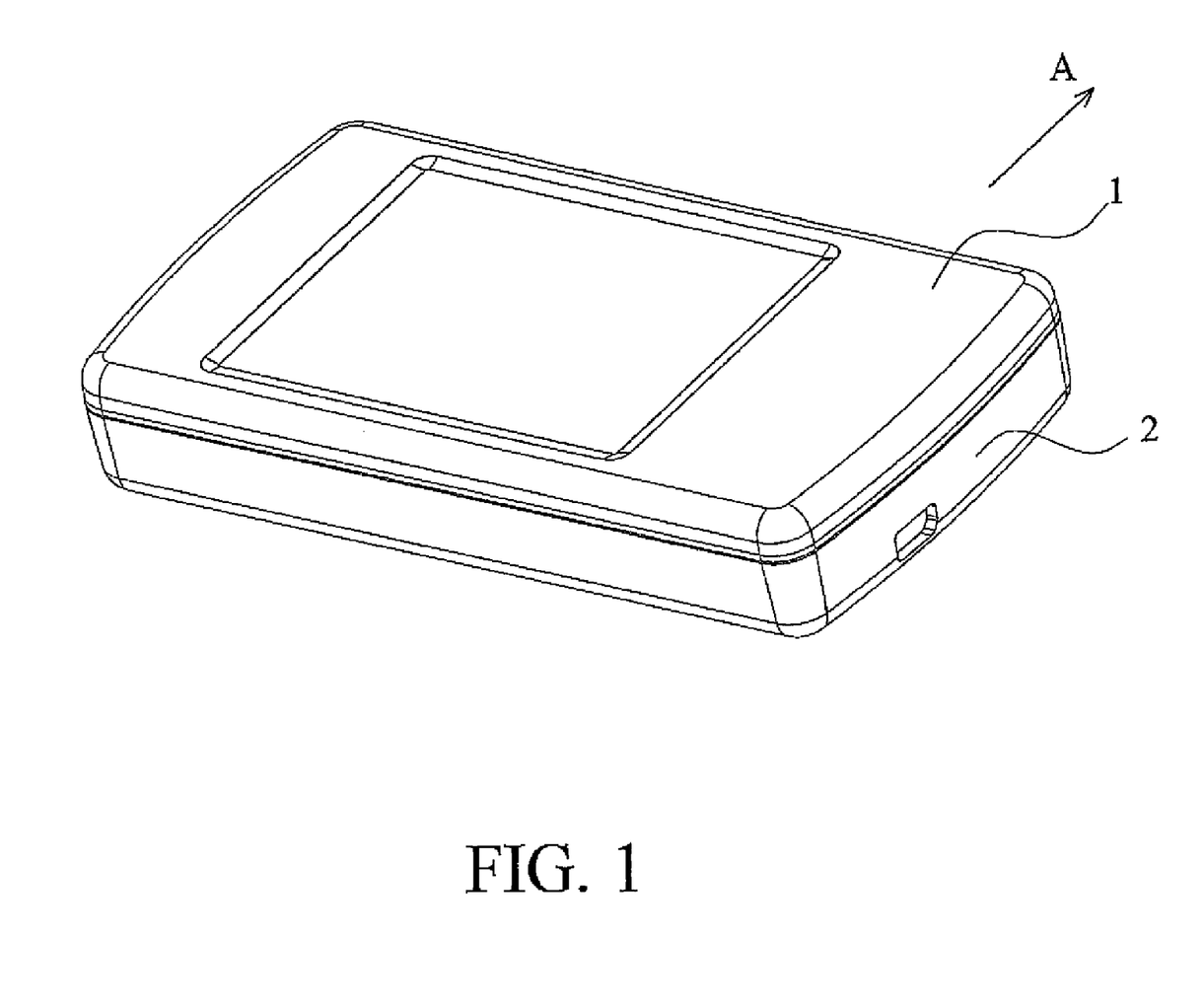
FIG. 1 is a schematic view of an electronic device in accordance with an embodiment of the invention.
Figure 2:
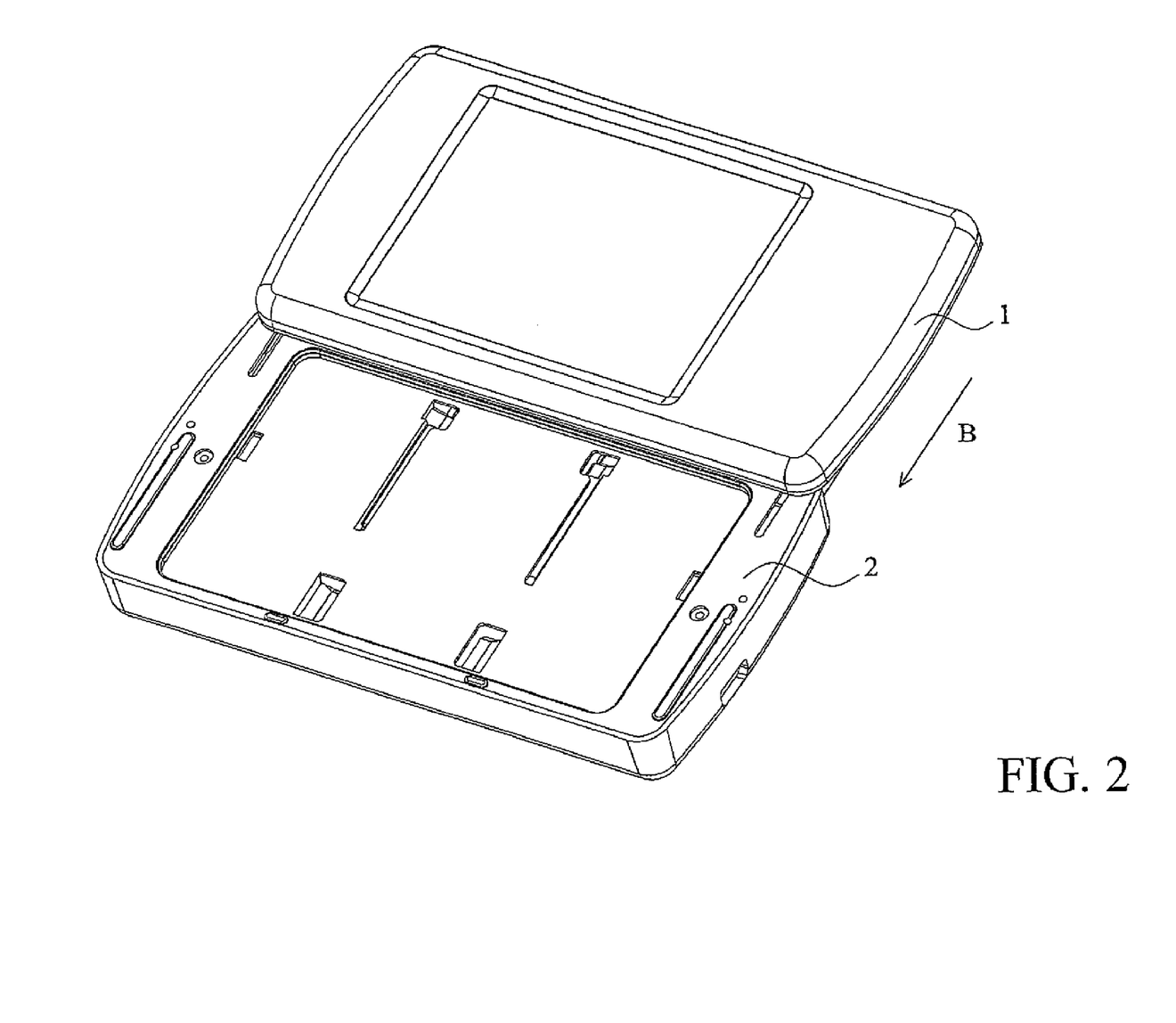
FIG. 2 is a schematic view of a display module of an electronic device in an opened state in accordance with the embodiment of the invention.
Figure 4A:
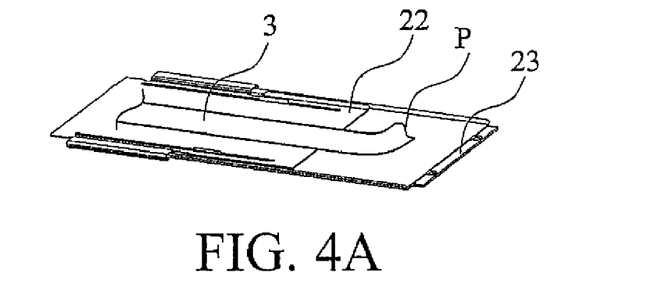
FIGS. 4A-4C depict an extension of a flexible printed circuit board of an electronic device in accordance with the embodiment of the invention.
Figure 4B:
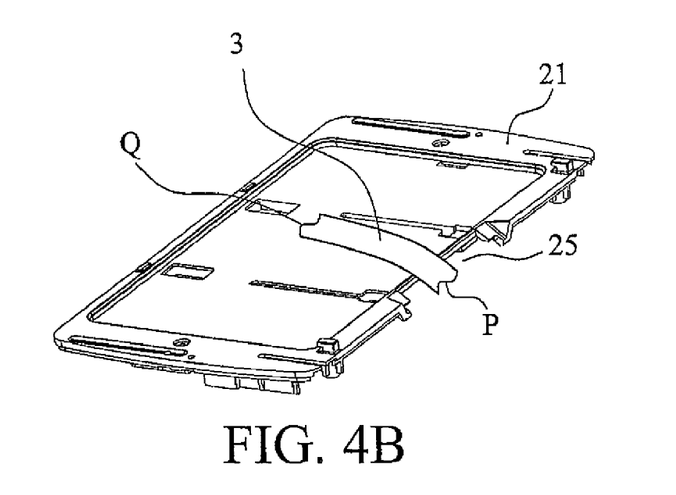
Figure 4C:
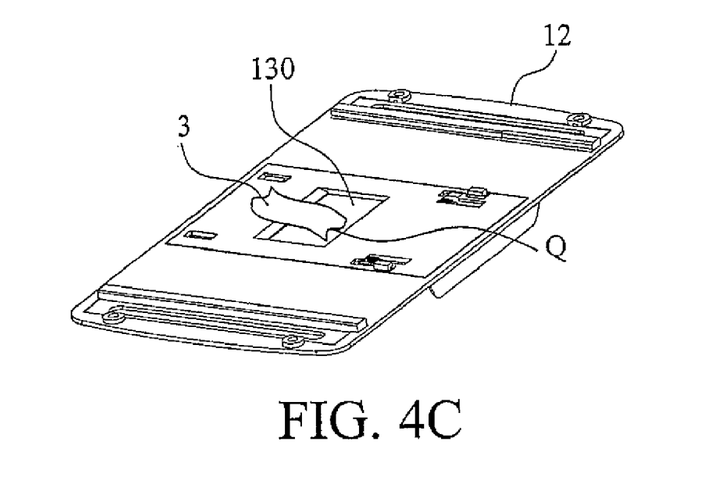

Referring to FIG. 1, an electronic device of the invention is shown. The electronic device 100 may be a mobile phone, a personal digital assistant (PDA), or other hand-held electronic devices. The electronic device 100 of the invention comprises a display module 1, a keyboard module 2 and a flexible printed circuit board 3 (as shown in FIGS. 4A-4C), wherein the keyboard module 2 is disposed below the display module 1 and the flexible printed circuit board 3 electrically connects the display module 1 and the keyboard module 2. When a user wants to use the electronic device 100, the display module 1 is pushed in a direction of arrow A, so that the display module 1 is changed from a closed state to an opened state to expose keys on the keyboard module 2, as shown in FIG. 2 wherein keys on the keyboard module 2 are removed for clearly showing the internal structure. When the user finishes using the electronic device 100, the display module 1 is pushed in a direction of arrow B, so that the display module 1 of the electronic device 100 is returned to the closed state.

In this embodiment of the invention, the keyboard module 2 can be designated as the second module, and the display module 1 can be designated as the first module.

Figure 3:
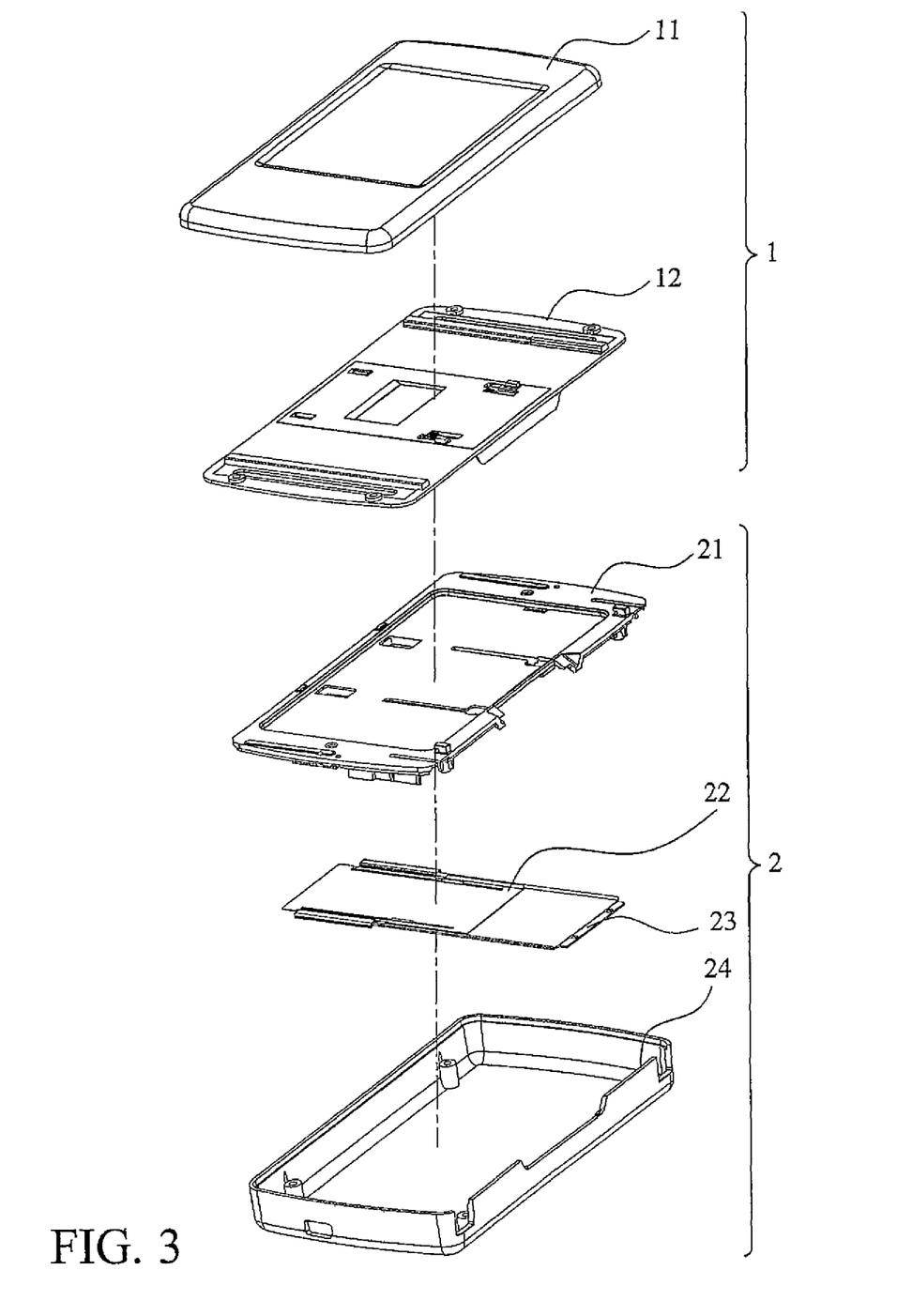
FIG. 3 is an exploded view of an electronic device in accordance with the embodiment of the invention.

FIG. 3 is an exploded view of an electronic device of the invention, wherein the display module 1 includes a top cover 11 and a bottom plate 12. The top cover 11 is disposed above the bottom plate 12. The keyboard module 2 is disposed below the display module 1 and includes a top plate 21 and a bottom cover 24 disposed below the top plate 21. The electronic device 100 further includes a first protecting cover 22 and a second protecting cover 23, wherein the first protecting cover 22 and the second protecting cover 23 are located between the top plate 21 and the bottom cover 24 and disposed below the top plate 21, and the first protecting cover 22 is disposed above the second protecting cover 23.

FIGS. 4A-4C depict an extension of the flexible printed circuit board of the electronic device, wherein the flexible printed circuit board 3 is cut off at point P and point Q and thus divided into three parts for convenient illustration. The bottom plate 12 has an opening 130, the top plate 21 has a notch 25, and the flexible printed circuit board 3, electrically connected to the keyboard module 2 and the display module 1, extends from the keyboard module 2 into the display module 1 through a first gap (as shown in FIG. 4A) between the first protecting cover 22 and the top plate 21, the notch 25 of the top plate 21, a second gap (as shown in FIG. 4B) between the top plate 21 and the bottom plate 12, and the opening 130 of the bottom plate 12 (as shown in 4C).

Figure 5:
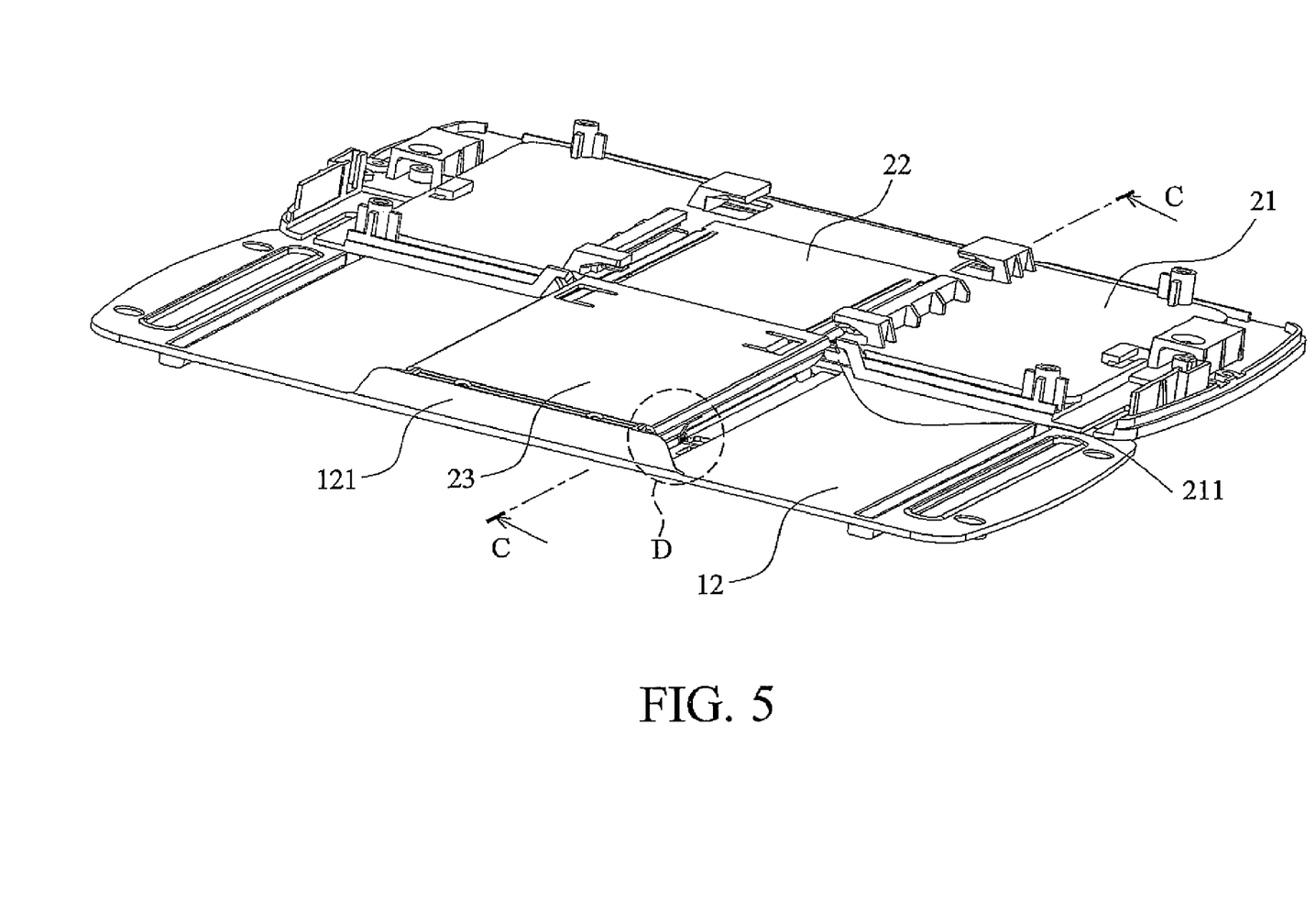
FIG. 5 is an assembly drawing of a bottom plate, a top plate, a first protecting cover, and a second protecting cover in accordance with the embodiment of the invention.
Figure 6:
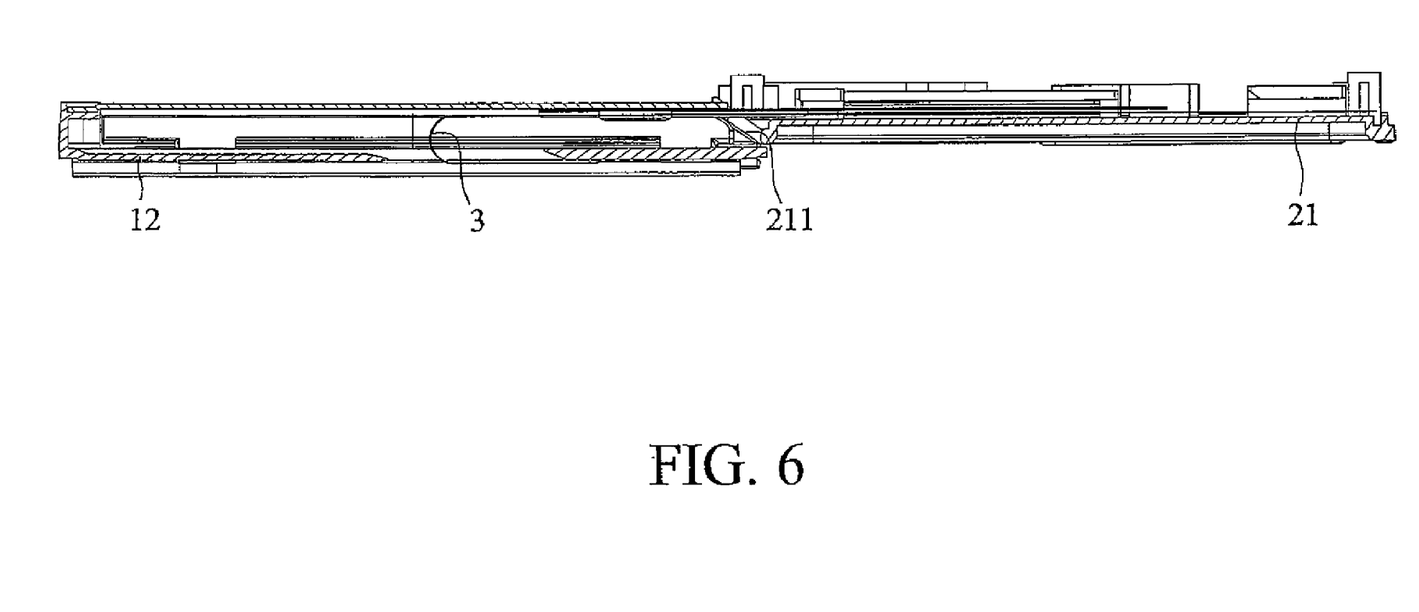
FIG. 6 is a C-C sectional view of FIG. 5.

Referring to FIG. 5, the electronic device is turned upside down to observe the upward assembly of the bottom plate, the top plate, a first protecting cover and a second protecting cover. FIG. 6 is a C-C sectional view of FIG. 5, wherein the bottom plate 12 has an extending part 121 extending from a side of the bottom plate 12. The second protecting cover 23 is fixed on the extending part 121 and can be moved along with the bottom plate 12. The first protecting cover 22 is disposed above the top plate 21 and slides relative to the second protecting cover 23. The top plate 21 has an inclined surface 211 extending from a side of the top plate 21.

Figure 7:
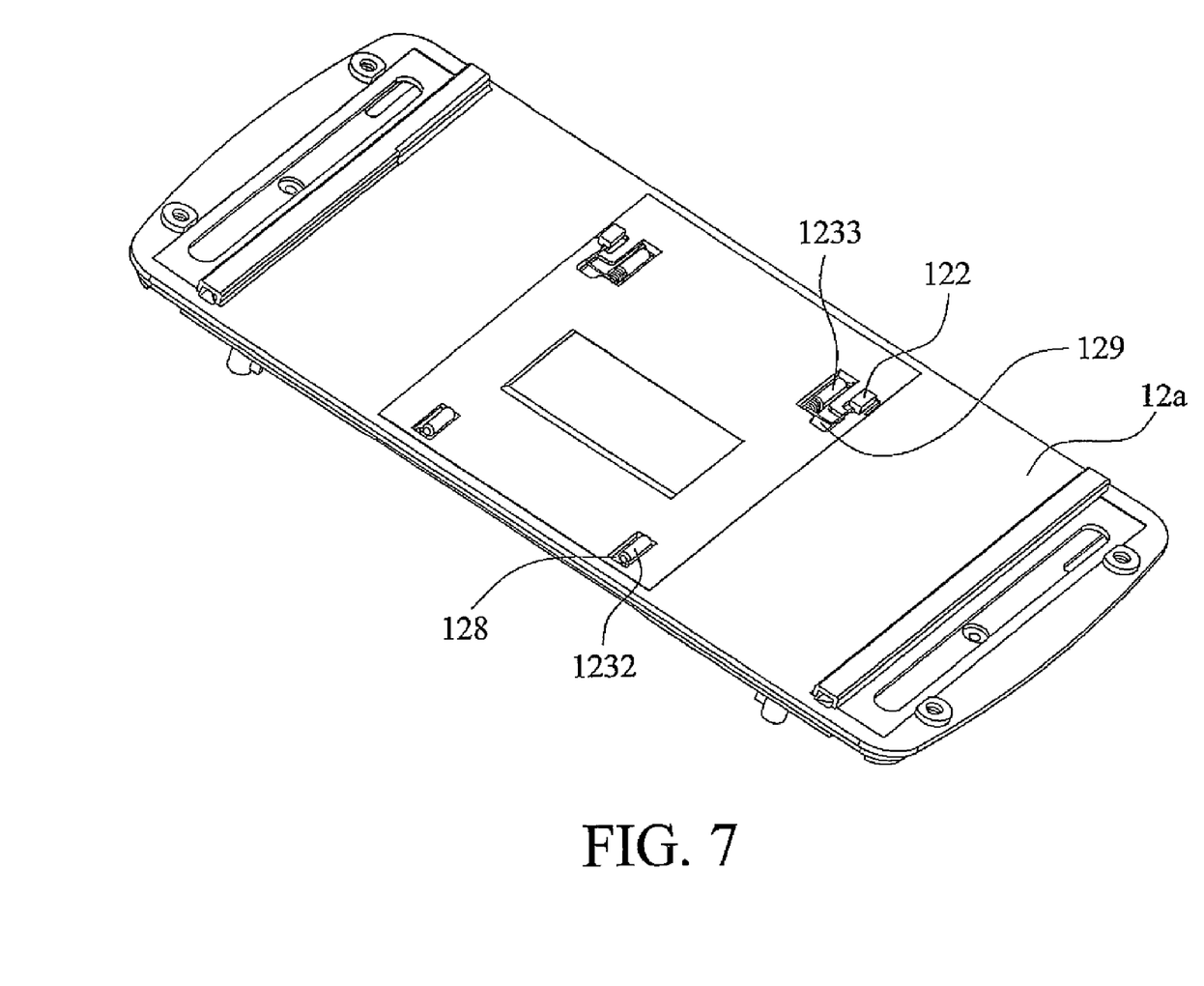
FIG. 7 is a schematic view of a top surface of a top plate of an electronic device in accordance with the embodiment of the invention.
Figure 8:
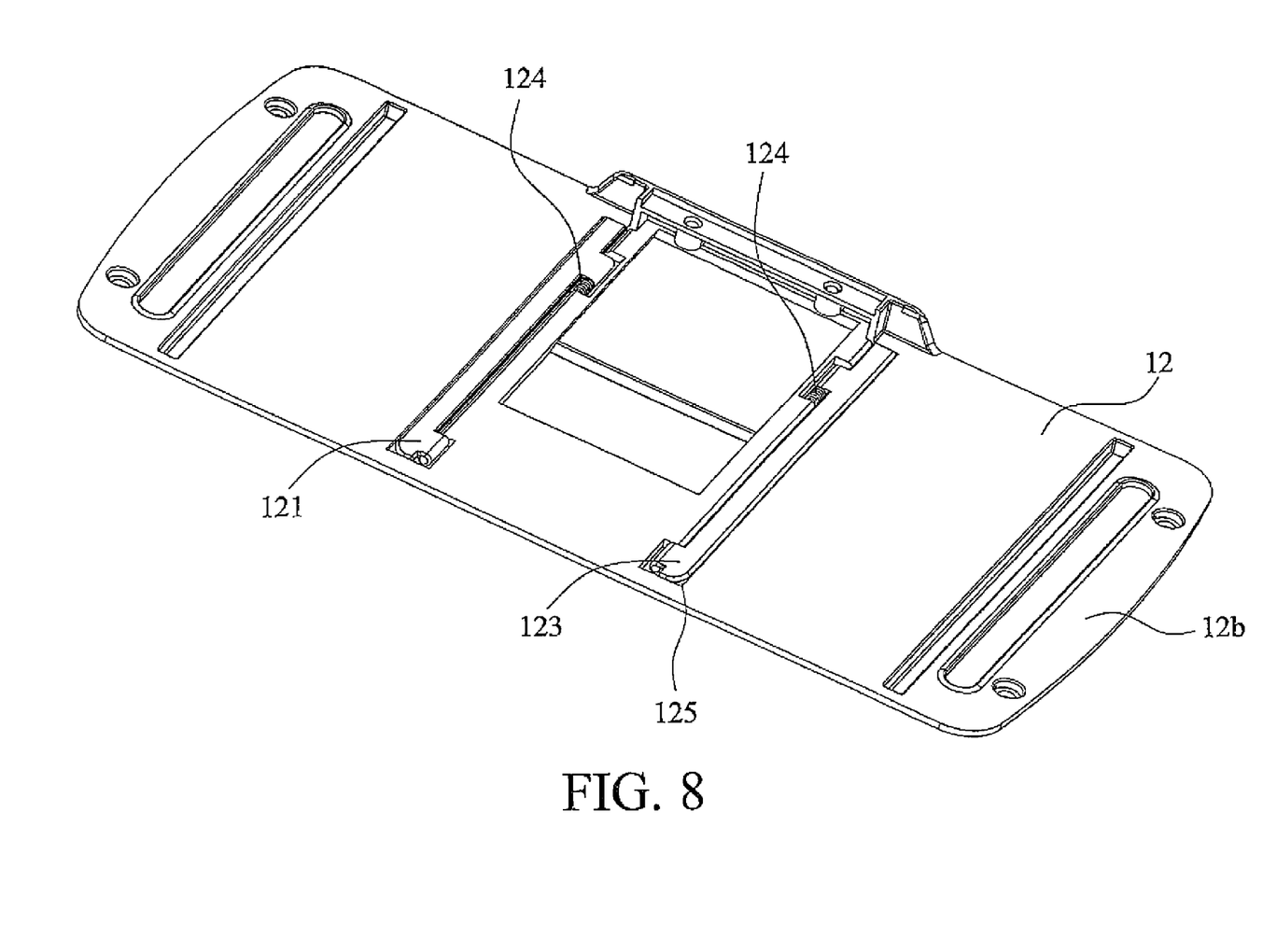
FIG. 8 is a schematic view of a bottom surface of a top plate of an electronic device in accordance with the embodiment of the invention.
Figure 9:
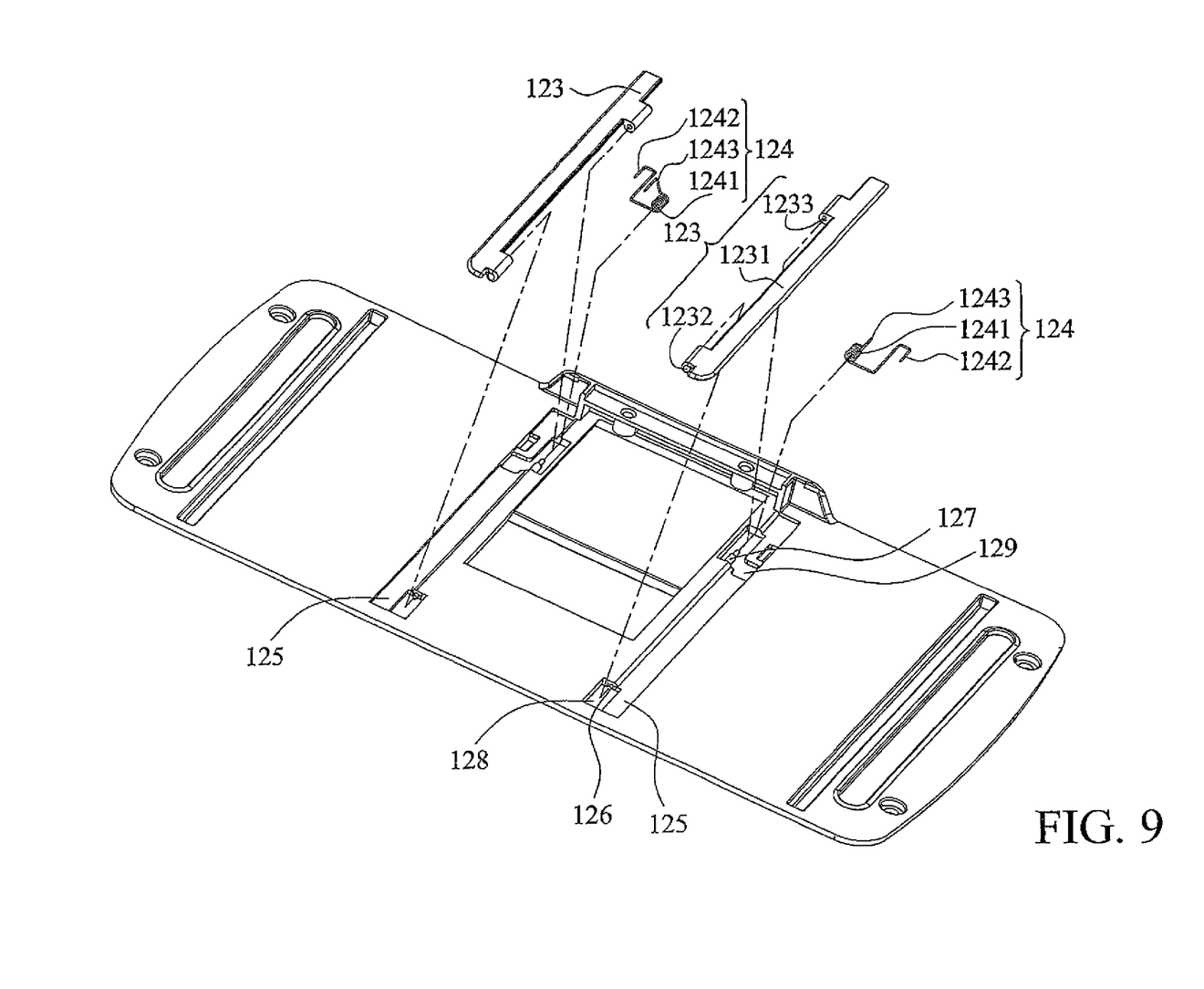
FIG. 9 is an exploded view of a top plate of an electronic device in accordance with the embodiment of the invention.

Referring to FIG. 7-9, FIG. 7 is a schematic view of a top surface of a top plate of an electronic device, FIG. 8 is a schematic view of a bottom surface of a top plate of an electronic device, and FIG. 9 is an exploded view of a top plate of an electronic device. The bottom plate 12 has a top surface 12a, a bottom surface 12b, a pair of L-shaped protrusions 122, a pair of side covers 123, a pair of torsional springs 124, a pair of grooves 125, a pair of second axle portions 126, a pair of first axle portions 127, a pair of first through holes 128, and a pair of second through holes 129, wherein the L-shaped protrusions 122, the side covers 123, the torsional springs 124, the grooves 125, the second axle portions 126, the first axle portions 127, the first through holes 128, and the second through holes 129 are in pairs, identical in shape, and disposed on two sides of the second protecting cover 23, respectively. Meanwhile, the pair of the torsional springs 124 includes a right hand spring and a left hand spring, symmetrical in shape, and disposed on two sides of the second protecting cover 23, respectively.

The L-shaped protrusion 122 is disposed on the top surface 12a, and the groove 125 is disposed on the bottom surface 12b. The first through hole 128 passes through the top surface 12a and the bottom surface 12b and connects with the groove 125. The second axle portion 126 is correspondingly disposed in the first through hole 128. The second through hole 129 passes through the top surface 12a and the bottom surface 12b and is disposed next to the L-shaped protrusion 122. The first axle portion 127 is correspondingly disposed in the second through hole 129.

The torsional spring 124 has a deformable part 1241, a first end 1242, and a second end 1243. The first end 1242 extends from the deformable part 1241, is an inverted U-shape and is fastened to the L-shaped protrusion 122. The second end 1243 extends from the deformable part 1241 and is L-shaped, and the first end 1242 and the second end 1243 are not on the same plane. The first axle portion 127 correspondingly extends into the deformable part 1241, so that the torsional spring 124 is rotatable about the first axle portion 127.

The side cover 123 has a rectangular body 1231, a first sleeve 1232 and a second sleeve 1233, wherein the first sleeve 1232 and the second sleeve 1233 are located at the same side of the rectangular body 1231. The second axle portion 126 extends into the first sleeve 1232. The first axle portion 127 extends into the second sleeve 1233. The second sleeve 1233 abuts against the deformable part 1241. Thus, the side cover 123 is rotatable about the second axle portion 126 and the first axle portion 127. The second end 1243 abuts against the rectangular body 1231. Thus, the side cover 123 is rotatably disposed on the bottom plate 12, and the torsional springs 124 can abut against both of the side cover 123 and the top plate 21.

Figure 10A:
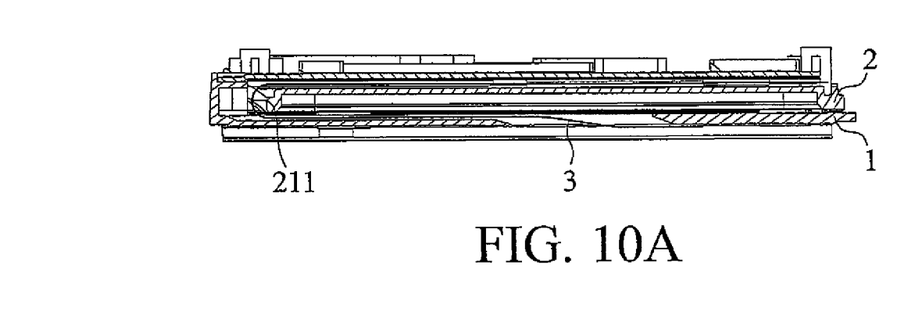
FIGS. 10A-10C depict the process of extending the electronic device in accordance with the embodiment of the invention.
Figure 10B:
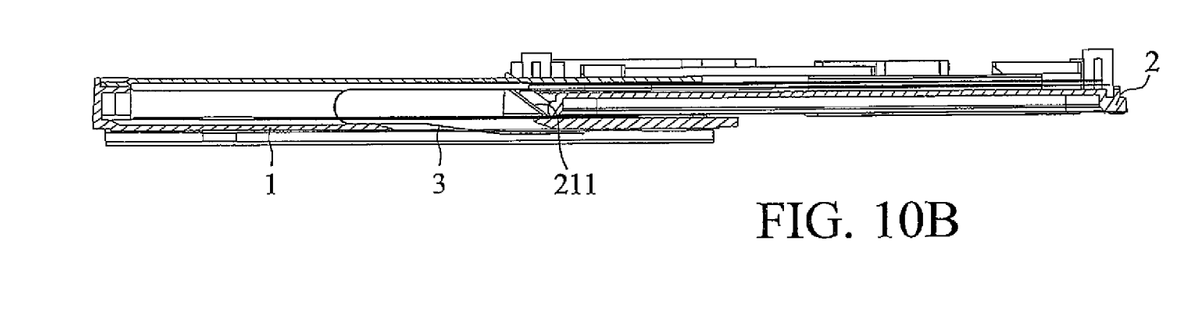
Figure 10C:
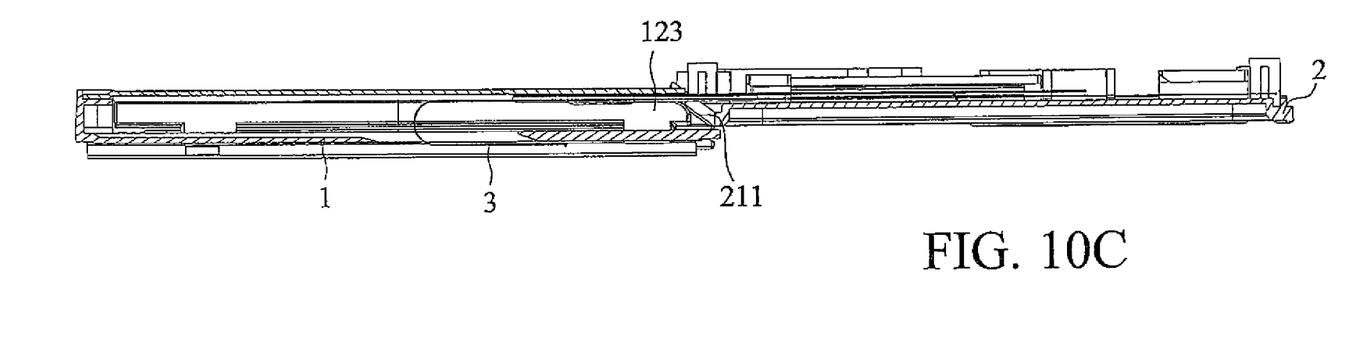
Figure 11:
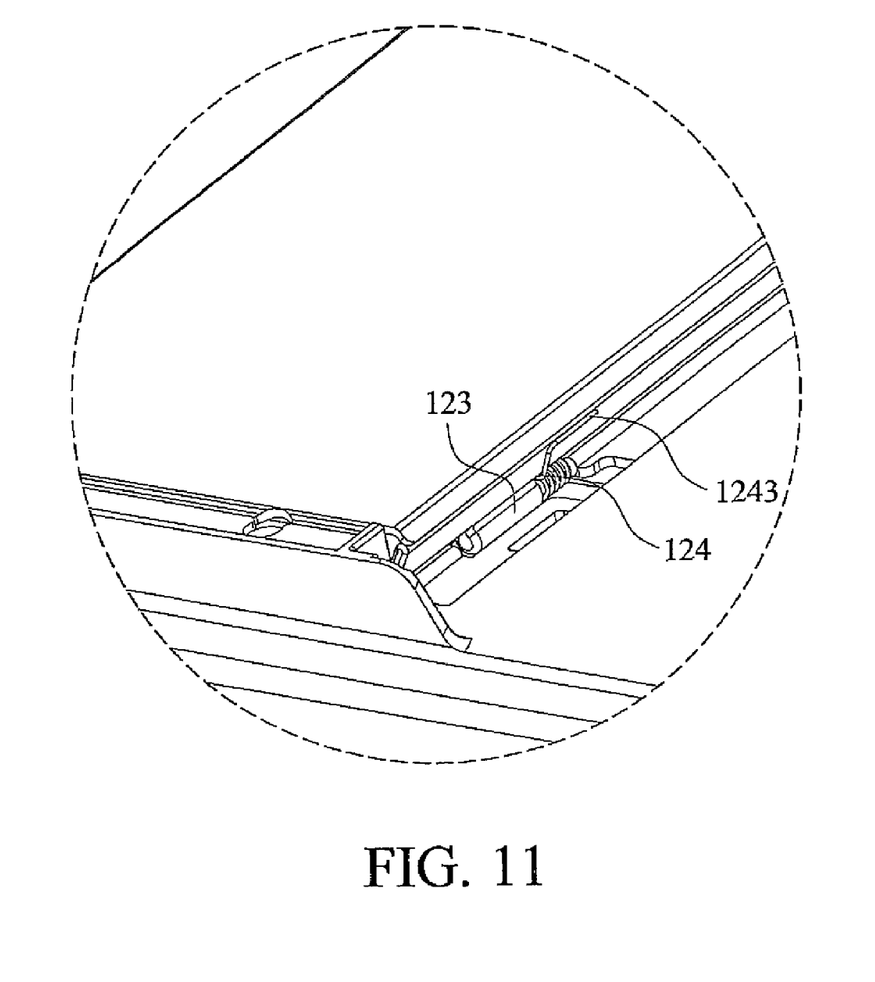
FIG. 11 is a partially enlarged view of a side cover and a torsional spring.

FIGS. 10A, 10B and 10C depict the operating process for an electronic device of the invention, wherein the electronic device 100 is turned upside down whereby the keyboard module 2 is disposed above the display module 1 similar to that of FIG. 6. FIG. 11 is a partially enlarged view of a side cover and a torsional spring. Referring to FIG. 10A, when the electronic device 100 is not used, the display module 1 is in the first position.

To use the electronic device 100, the bottom plate 12 of the display module 1 is pushed in the direction of arrow A (as shown in FIG. 10B). Thus, the flexible printed circuit board 3 is extended, and the first protecting cover 22 and the second protecting cover 23 are changed from a closed state to an opened state to totally cover the flexible printed circuit board 3.

When the display module 1 is totally opened, the display module 1 is in the second position (as shown in FIG. 10C). During the extension of the display module 1, the potential energy stored in the deformable part 1241 of the torsional spring 124 is released, the second end 1243 exerts a restoring force on the side cover 123, and the side cover 123 overturns downwardly through the inclined surface 211 and abuts against the second protecting cover 23 (as shown in FIG. 11). Thus, the side cover 123 stands at an angle from the bottom plate 21 to totally cover two sides of the flexible printed circuit board 3.

To return the electronic device 100 to the closed state, the display module 1 is pushed in the direction of arrow B (as shown in FIG. 10B), and the side cover 123 overturns upwardly through the inclined surface 211 and returns to the groove 125, and the side cover 123 presses the second end 1243 of the torsional spring 124, and the deformable part 1241 is deformed to store potential energy. Thus, the side cover 123 is disposed above the keys of the keyboard module 2 and parallel to the bottom plate 12, and the display module 1 returns to the first position.

From the above description, the electronic device of the invention is provided with side covers, protecting covers and torsional springs, through which the flexible printed circuit board can be totally protected when the display module and the keyboard module of the electronic device are totally opened to increase the available area of the electronic device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An electronic device comprising:
   a first module comprising a bottom plate and two side covers rotatably disposed on the bottom plate;
   a second module disposed below the first module and comprising a top plate;

a flexible printed circuit board connecting the first module and the second module;

a first protecting cover disposed below the top plate; and a second protecting cover disposed below the top plate, wherein an end of the second protecting cover is fixed on the bottom plate, and the two side covers respectively correspond to two sides of the second protecting cover, wherein when the first module slides relative to the second module from a first position to a second position, the bottom plate forces the second protecting cover to change from a closed state to an opened state to cover the flexible printed circuit board.

2. The electronic device as claimed in claim 1, wherein the bottom plate has an opening, the top plate has a notch, and the flexible printed circuit board extends from the second module into the first module through a first gap between the first protecting cover and the top plate, the notch, a second gap between the top plate and the bottom plate, and the opening in sequence.

3. An electronic device comprising:

a first module comprising a bottom plate;

a second module disposed below the first module and comprising a top plate;

a flexible printed circuit board connecting the first module and the second module;

a first protecting cover disposed below the top plate;

a second protecting cover disposed below the top plate, wherein an end of the second protecting cover is fixed on the bottom plate; and two torsional springs, wherein when the first module slides relative to the second module from a first position to a second position, the bottom plate forces the second protecting cover to change from a closed state to an opened state to cover the flexible printed circuit board, and wherein the first module further comprises two side covers respectively corresponding to two sides of the second protecting cover, the top plate has two inclined surfaces, the side covers are rotatably disposed on the bottom plate, the torsional springs abut the side covers and the top plate, and when the first module slides relative to the second module from the first position to the second position, each side cover parallel to the bottom plate slides through the inclined surface and rotates to an angle with respect to the bottom plate by a restoring force of the torsional spring.

4. The electronic device as claimed in claim 3, wherein each side cover comprises a rectangular body, a first sleeve and a second sleeve, and the first sleeve and the second sleeve are located at the same side of the rectangular body.

5. The electronic device as claimed in claim 4, wherein the bottom plate further comprises a first axle portion and a second axle portion, the first axle portion extends into the second sleeve, the second axle portion extends into the first sleeve, and the side cover is rotatable about the first axle portion and the second axle portion.

6. The electronic device as claimed in claim 5, wherein the bottom plate further comprises a groove accommodating the rectangular body.

7. The electronic device as claimed in claim 6, wherein the bottom plate further comprises a first through hole connecting with the groove and the first sleeve and the second axle portion are disposed in the first through hole.

8. The electronic device as claimed in claim 5, wherein the bottom plate further comprises two L-shaped protrusions to which the torsional springs are respectively fastened.

9. The electronic device as claimed in claim 8, wherein the bottom plate further comprises two second through holes, each second through hole is correspondingly disposed next to the L-shaped protrusion, and the second sleeve and the first axle portion are disposed in the second through hole.

10. The electronic device as claimed in claim 3, wherein each torsional spring comprises a first ends a second end, and a deformable part disposed between the first end and the second end.

11. The electronic device as claimed in claim 10, wherein the first end is an inverted U-shape, the second end is L-shaped, and the first end and the second end are not on the same plane.

12. The electronic device as claimed in claim 10, wherein the bottom plate further comprises a first axle portion, the first axle portion correspondingly extends into the deformable part, and the deformable part is rotatable about the first axle portion.

13. The electronic device as claimed in claim 10, wherein the bottom plate further comprises a second through hole and the deformable part is correspondingly disposed in the second through hole.

14. The electronic device as claimed in claim 1, wherein the first module further comprises a top cover located above the bottom plate.

15. The electronic device as claimed in claim 1, wherein the second module further comprises a bottom cover located below the top plate.

16. The electronic device as claimed in claim 1, wherein when the second protecting cover changes from the closed state to the opened state, the two side covers are configured to rotate to an angle with respect to the bottom plate.

* * * * *